United States Patent
Hengst et al.

(10) Patent No.: US 10,968,802 B2
(45) Date of Patent: Apr. 6, 2021

(54) METHOD FOR PREVENTING A SELECTIVE CATALYTIC REDUCTION (SCR) CATALYST FROM BEING CONTAMINATED WITH PLATINUM

(71) Applicant: UMICORE AG & CO. KG, Hanau-Wolfgang (DE)

(72) Inventors: Christoph Hengst, Butzbach (DE); Marco Lopez, Frankfurt (DE)

(73) Assignee: UMICORE AG & CO. KG, Hanau-Wolfgang (DE)

(*) Notice: Subject to any disclaimer, the term of this patent is extended or adjusted under 35 U.S.C. 154(b) by 59 days.

(21) Appl. No.: 16/061,494

(22) PCT Filed: Dec. 16, 2016

(86) PCT No.: PCT/EP2016/081334
§ 371 (c)(1),
(2) Date: Jun. 12, 2018

(87) PCT Pub. No.: WO2017/103040
PCT Pub. Date: Jun. 22, 2017

(65) Prior Publication Data
US 2020/0032690 A1 Jan. 30, 2020

(30) Foreign Application Priority Data
Dec. 17, 2015 (DE) ..................... 10 2015 225 579.4

(51) Int. Cl.
*F01N 3/035* (2006.01)
*F01N 3/20* (2006.01)
*B01J 23/42* (2006.01)

(52) U.S. Cl.
CPC ............ *F01N 3/2073* (2013.01); *B01J 23/42* (2013.01); *F01N 3/035* (2013.01); *F01N 3/208* (2013.01)

(58) Field of Classification Search
CPC .......... B01J 23/42; F01N 3/035; F01N 3/208; F01N 3/2073
See application file for complete search history.

(56) References Cited

U.S. PATENT DOCUMENTS

| | | | |
|---|---|---|---|
| 5,462,907 A | 10/1995 | Farrauto et al. | |
| 5,627,124 A | 5/1997 | Farrauto et al. | |
| 8,057,768 B2 | 11/2011 | Schneider et al. | |
| 8,226,896 B2* | 7/2012 | Pfeifer | B01D 53/9468 422/171 |
| 8,293,182 B2* | 10/2012 | Boorse | B01D 53/9468 422/180 |
| 8,540,952 B2* | 9/2013 | Swallow | B01D 53/94 423/213.2 |
| 8,557,203 B2* | 10/2013 | Bailey | B01D 53/944 422/170 |
| 8,637,426 B2* | 1/2014 | Hoke | B01D 53/945 502/339 |
| 8,661,784 B2* | 3/2014 | Aslam | B01D 53/9418 60/274 |
| 8,667,785 B2 | 3/2014 | Blakeman et al. | |
| 8,668,891 B2 | 3/2014 | Blakeman et al. | |
| 8,756,926 B2* | 6/2014 | Chandler | F01N 3/0222 60/301 |
| 8,765,625 B2* | 7/2014 | Hao | B01D 53/944 502/245 |
| 8,795,617 B2* | 8/2014 | Swallow | B01D 53/9418 423/213.2 |
| 8,986,635 B2 | 3/2015 | Blakeman et al. | |
| 9,046,022 B2 | 6/2015 | Blakeman et al. | |
| 9,095,816 B2* | 8/2015 | Spurk | B01D 53/9418 |
| 9,259,684 B2* | 2/2016 | Blakeman | B01J 35/0006 |
| 9,321,009 B2* | 4/2016 | Wan | B01D 53/9431 |
| 9,346,019 B2 | 5/2016 | Pfeifer et al. | |
| 9,347,349 B2* | 5/2016 | Blakeman | B01D 53/9431 |
| 9,358,503 B2* | 6/2016 | Wan | F01N 3/0842 |
| 9,492,787 B2 | 11/2016 | Schuetze et al. | |
| 9,527,031 B2* | 12/2016 | Chandler | F01N 3/0222 |
| 9,527,034 B2* | 12/2016 | Bergeal | B01J 37/0205 |
| 9,533,295 B2* | 1/2017 | Muller-Stach | B01J 37/0244 |
| 9,545,602 B2* | 1/2017 | Sonntag | B01J 29/763 |
| 9,597,661 B2 | 3/2017 | Blakeman et al. | |
| 9,610,564 B2* | 4/2017 | Xue | B01J 37/10 |
| 9,636,634 B2* | 5/2017 | Chiffey | B01D 53/72 |
| 9,643,161 B2* | 5/2017 | Chiffey | B01J 37/0244 |

(Continued)

FOREIGN PATENT DOCUMENTS

DE 69 230 759 T2 7/2000
DE 10 2012 222 801 A1 6/2013

(Continued)

OTHER PUBLICATIONS

International Preliminary Report on Patentability for International Application No. PCT/EP2016/081334 (17 pages—in German with English translation).
Yu-Yao, Y. Low-Concentration Supported Precious Metal Catalysts Prepared by Thermal Transport. Journal of Catalysis, 1987 vol. 106, No, 1, pp. 307-312.
International Search Report for PCT/EP2016/081334, dated Mar. 20, 2017 in English and German Language (6 pgs.).
M. Pfeifer, et al., SAE Technical Paper Series, 2005-01-1756. "The Second Generation of Catalyzed Diesel Particulate Filter Systems for Passenger Cars—Particulate Filters with Integrated Oxidation Catalyst Function-" (Apr. 11-14, 2005); 15 pgs.

(Continued)

*Primary Examiner* — Cam N. Nguyen
(74) *Attorney, Agent, or Firm* — Smith, Gambrell & Russell, LLP

(57) ABSTRACT

The present invention relates to a method for preventing an SCR catalyst from being contaminated with platinum group metal in an emission control system comprising, upstream of the SCR catalyst, a catalyst that contains platinum group metal, characterized in that a material zone containing a mixture of aluminum oxide and cerium oxide is located upstream of the SCR catalyst.

17 Claims, No Drawings

(56) References Cited

U.S. PATENT DOCUMENTS

| | | | |
|---|---|---|---|
| 9,662,611 B2* | 5/2017 | Wan | F01N 3/035 |
| 9,694,322 B2* | 7/2017 | Teysset | B01J 23/42 |
| 9,707,542 B2* | 7/2017 | Bergeal | B01J 37/0244 |
| 9,764,310 B2* | 9/2017 | Markatou | F01N 3/18 |
| 9,993,772 B2* | 6/2018 | Gilbert | B01D 53/9436 |
| 10,105,692 B2* | 10/2018 | Andersen | B01D 53/8628 |
| 10,137,414 B2* | 11/2018 | Hoke | B01D 53/945 |
| 10,188,987 B2* | 1/2019 | Li | F01N 3/2066 |
| 10,201,807 B2* | 2/2019 | Larsson | B01D 53/9418 |
| 10,253,667 B2* | 4/2019 | Yang | F01N 13/0093 |
| 10,369,555 B2* | 8/2019 | Burgess | B01D 53/9418 |
| 10,449,518 B2* | 10/2019 | Markatou | F01N 3/18 |
| 10,451,918 B2* | 10/2019 | Yoon | G02F 1/134363 |
| 2007/0089403 A1* | 4/2007 | Pfeifer | F01N 3/2066 60/286 |
| 2011/0138777 A1 | 6/2011 | Jen et al. | |
| 2011/0206584 A1 | 8/2011 | Dobson et al. | |
| 2013/0149207 A1 | 6/2013 | Castagnola et al. | |
| 2014/0186245 A1* | 7/2014 | Blakeman | F01N 3/103 423/213.5 |
| 2017/0173530 A1* | 6/2017 | Blakeman | B01J 35/0006 |
| 2019/0168198 A1* | 6/2019 | Larsson | B01D 53/9418 |
| 2019/0308173 A1* | 10/2019 | Markatou | B01J 23/44 |

FOREIGN PATENT DOCUMENTS

| | | |
|---|---|---|
| DE | 10 2012 222 806 A1 | 6/2013 |
| EP | 1 938 893 A2 | 7/2008 |
| EP | 2 653 681 A1 | 10/2013 |
| EP | 2 674 584 A1 | 12/2013 |
| WO | 93/10886 | 6/1993 |
| WO | 99/39809 | 8/1999 |
| WO | 2009/140989 A1 | 11/2009 |
| WO | 2013/088132 A1 | 6/2013 |
| WO | 2013/088133 A1 | 6/2013 |
| WO | 2016/146966 A1 | 9/2016 |

OTHER PUBLICATIONS

H. W. Jen, et el., SAE Technical Paper Series, 2008-01-2488, "Detection, Origin and Effect of Ultra-Low Platinum Contamination on Diesel-SCR Catalysts" (Oct. 6-9, 2008); 9 pgs.

G. Cavataio, et el., SAE Technical Paper Series. 2005-01-627. "Impact and Prevertion of Ultra-Low Contamination of Platinum Group Metals on SCR Catalysts Due to DOC Design" (2009); 13 pgs.

* cited by examiner

METHOD FOR PREVENTING A SELECTIVE CATALYTIC REDUCTION (SCR) CATALYST FROM BEING CONTAMINATED WITH PLATINUM

The present invention relates to a method for preventing an SCR catalyst from being contaminated with platinum in an exhaust gas treatment system from platinum-containing components of the exhaust gas treatment system arranged upstream.

In addition to carbon monoxide (CO) and nitrogen oxides ($NO_x$), the exhaust gas of motor vehicles operated by diesel engines contains components that originate from the incomplete combustion of the fuel in the cylinder combustion chamber. In addition to residual hydrocarbons (HC), this includes particulate emissions that are generally also present in the form of a gas and are termed "diesel soot" or "soot particles."

To clean these exhaust gases, the aforementioned components must be converted to harmless compounds as completely as possible. This is only possible with the use of suitable catalysts.

In this way, carbon monoxide (CO), gaseous hydrocarbons (HC) and, if applicable, organic agglomerates adhering to the soot particles (so-called "Volatile Organic Fraction" VOF) can be oxidatively removed using oxidation catalysts. Oxidation catalysts have been known for a long time in the prior art and described in a wide range of embodiments. In most cases, the precious metals platinum and/or palladium are used as oxidation-catalytically active components (see, for example, US2011/0206584 A1); however, gold-containing catalysts have also been described, for example in EP1938893A2.

In order to remove particulate emissions from the exhaust gas of diesel vehicles, special particulate filters are used that can be provided with an oxidation-catalytically active coating to improve their properties. As described in detail in SAE document SAE 2005-01-1756, such a coating serves to reduce the activation energy for oxygen-based particle combustion (soot combustion) and hence to reduce the soot ignition temperature on the filter, to improve the passive regeneration behavior by oxidation of the nitrogen monoxide contained in the exhaust gas into nitrogen dioxide, and to suppress breakthroughs of hydrocarbon and carbon monoxide emissions.

Nitrogen oxides from the exhaust gases of diesel engines can for example be converted into harmless nitrogen by means of selective catalytic reduction (SCR) using ammonia as a reducing agent on a suitable catalyst, the SCR catalyst. The reducing agent must be metered into the exhaust gas system from a conveyed additional tank by means of an injection nozzle upstream of the SCR catalyst. Preferably, not ammonia itself but rather a compound that can be easily broken down into ammonia, such as urea or ammonium carbamate, is conveyed.

In order for the addressed harmful exhaust gas components to be removable to the required extent, the aforementioned catalysts or filters must be suitably combined with each other into an exhaust gas treatment system.

In known exhaust gas treatment systems, which are for example described in WO99/39809 and WO2009/140989, first the oxidation catalyst, then the diesel particulate filter, and lastly the SCR catalyst are arranged in the direction of flow of the exhaust gas. Located between the diesel particulate filter and the SCR catalyst is also an injection device for metering the reducing agent. Depending on the requirement, problem solutions without diesel particulate filters are however also possible. In these cases, the exhaust gas treatment system comprises first an oxidation catalyst and then the SCR catalyst in the direction of flow of the exhaust gas. The injection device for metering the reducing agent is in this case arranged between the oxidation catalyst and the SCR catalyst.

When these systems are operating, it is revealed that at high temperatures and depending on the $\lambda$-value, the oxidation catalyst, in particular when it is platinum-rich, emits traces of platinum into the gas phase, which are transported with the exhaust gas stream to the SCR catalyst and contaminate it. Since platinum exhibits high ammonia oxidation activity, not enough ammonia is consequently available for the SCR reaction at temperatures above approximately 300° C. and the conversion of nitrogen oxides decreases. In addition, an elevated formation of nitrous oxide ($N_2O$) is also observed, primarily within a temperature range around 250° C. This phenomenon is for example described in SAE documents SAE 2008-01-2488 and SAE 2009-01-0627.

To solve this problem, US2011/138777 A1 proposes arranging a "platinum group metal trap" that contains cerium oxide or a perovskite material as effective components in the exhaust gas system downstream of the oxidation catalyst and upstream of the SCR catalyst. WO2013/088132A1 also teaches arranging a third catalyst substrate with a material that is able to bind volatile platinum group metal between an SCR catalyst and a catalyst that comprises a platinum group metal.

However, the above-described approaches have the disadvantage that the exhaust gas treatment system must be supplemented with an additional component which is very difficult to realize in light of the limited space in the underbody of a vehicle. In addition, this solution results in higher costs.

It has also been proposed in WO2013/088133A1 to equip oxidation-catalytically active catalysts, i.e., diesel oxidation catalysts or particulate filters provided with an oxidation-catalytically active coating, with a material zone that can remove platinum group metals, in particular platinum, contained in the exhaust gas flow. An additional component is therefore no longer necessary in this case. Proposed as the "platinum group metal trap" is a metal oxide that is selected from the group consisting of possibly stabilized aluminum oxide, amorphous silicon aluminum oxide, possibly stabilized zirconium oxide, cerium oxide, titanium oxide, a possibly stabilized cerium/zirconium mixed oxide, and mixtures of two or more thereof. Cerium oxide, which is ascribed a particular affinity with platinum, is particularly preferred.

According to EP2653681A1, palladium, gold or mixtures thereof are proposed as a "platinum trap" for a diesel particulate filter with an oxidation-catalytically active coating. EP2674584A1 also discloses palladium, gold or mixtures thereof as a "platinum trap."

Known from WO93/10886A1 is an oxidation catalyst that comprises a catalytic material which substantially consists of a combination of cerium oxide and aluminum oxide, each with a BET surface of at least 10 $m^2/g$.

It was surprisingly found that mixtures consisting of cerium oxide and aluminum oxide are particularly active platinum group metal catchers, in particular platinum catchers.

The present invention accordingly relates to a method for preventing the contamination of the SCR catalyst with platinum group metal in an exhaust gas treatment system that comprises a catalyst containing platinum group metal upstream of the SCR catalyst, characterized in that a material zone that contains a mixture of aluminum oxide and cerium oxide is located upstream of the SCR catalyst.

In the context of the present invention, a catalyst containing a platinum group metal is understood to be in particular an oxidation catalyst containing platinum group metal, or a particulate filter provided with an oxidation-catalytically active coating containing platinum group metal.

In the context of the present invention, platinum group metal is understood to be in particular platinum.

The mixtures to be used according to the invention and consisting of aluminum oxide and cerium oxide comprise aluminum oxide, in particular in amounts of 10 to 90% by weight, such as 30 to 70 or 40 to 60% by weight, relative to the weight of the mixture of aluminum oxide and cerium oxide.

High-surface-area aluminum oxide, as routinely used in the field of automobile exhaust gas catalysis, is preferably used as the aluminum oxide. It preferably has a specific surface of 50 to 200 m$^2$/g. The aluminum oxide can also for example be stabilized with lanthanum, and in this case contains lanthanum oxide in amounts of 1 to 10% by weight, preferably 3 to 6% by weight, in each case relative to the overall weight of the stabilized aluminum oxide.

Preferably pure cerium oxide, i.e., cerium oxide with a cerium oxide content of 80 to 100% by weight, is used as the cerium oxide. Such cerium oxides are known to the person skilled in the art and are commercially available.

The mixtures to be used according to the invention and consisting of aluminum oxide and cerium oxide are preferably physical mixtures. They can be mixed in powdered form and then be incorporated into a washcoat. They can however also be incorporated into a washcoat simultaneously or sequentially without prior mixing.

The mixtures consisting of aluminum oxide and cerium oxide are in particular used at amounts of 10 to 300 g/L, in particular 30 to 200 g/L, relative to the volume of the catalyst substrate.

Catalysts containing platinum group metal in the context of the present invention are flow-through substrates or filter substrates, in particular wall flow filters, that bear oxidation-catalytically active components in the form of one or more coatings. They contain as oxidation-catalytically active components in particular platinum, but they can also additionally contain one or more other platinum group elements, in particular palladium and/or rhodium, or for example gold. The oxidation-catalytically active components are borne on the flow-through or filter substrate on a high-surface-area, inert carrier material. A particularly preferred oxidation-catalytically active coating contains platinum on aluminum oxide.

The method according to the invention can be used to particular advantage when the oxidation-catalytically active coating is "platinum-rich," i.e. when it contains exclusively platinum or platinum in a mixture with other components, wherein platinum is in excess, as oxidation-catalytically active components.

Frequently, platinum is used by itself or mixtures of platinum and palladium are used, wherein the weight ratio of platinum to palladium is 12:1 to 4:1.

The entire loading with oxidation-catalytically active metals is preferably 1 to 3.5 g/L (100 g/ft$^2$) relative to the volume of the oxidation-catalytically active coating.

In addition to the oxidation-catalytically active components, the catalysts containing platinum group metal can, in the context of the present invention, also contain components that bind nitrogen oxides chemically under lean, i.e., oxygen-rich, exhaust gas conditions, and can release nitrogen oxides under rich, i.e., low-oxygen, exhaust gas conditions. Such components are known as nitrogen oxide storage components, and are preferably oxides, carbonates or hydroxides of the alkali metals, alkaline earth metals and rare-earth metals, wherein barium and strontium are particularly preferred.

This holds true in particular for catalysts containing platinum group metal that are borne on flow-through substrates. Accordingly, such oxidation catalysts can also contain an LNT function (lean NOx trap) in the context of the present invention.

The flow-through or filter substrates can consist of metal and in particular ceramic materials. Preferably, they consist of cordierite, silicon carbide, mullite or aluminum titanate.

Preferably, wall flow filter substrates are used as the diesel particulate filter. These are honeycomb bodies with inflow and outflow channels that are mutually sealed in a gas-tight manner, bordered by porous walls and separate from each other. The particle-containing exhaust gases which stream into the inflow channels are forced to pass through the porous wall by a gas-tight sealing plug located on the outlet side and escape again from the wall flow filter substrate from the outlet channels sealed on the inflow side. In so doing, diesel soot is filtered out of the exhaust gas.

The aforementioned flow-through or filter substrates are frequently described in literature.

The material zone containing a mixture of aluminum oxide and cerium oxide can be borne on a separate catalyst substrate that is located between the platinum group metal-containing catalyst and the SCR catalyst.

Advantageously, however, the material zone containing a mixture of aluminum oxide and cerium oxide is located as an additional material zone on the platinum group metal-containing catalyst.

This material zone can in this case be present in various ways. In one embodiment of the present invention, it is present as an additional layer on the oxidation-catalytically active coating distributed homogeneously over the entire length of the substrate and covers it, at least on a part of its entire length, starting from the end of the flow-through or filter substrate arranged at the outflow side. The material zone that removes the traces of platinum group metal contained in the exhaust gas flow takes up preferably 50 to 100%, preferably 50, 60, 70, 80 or 90%, of the entire length of the filter substrate in this case.

In another embodiment, the oxidation-catalytically active coating and the material zone containing a mixture of aluminum oxide and cerium oxide are arranged in separate zones on the flow-through or filter substrate. In contrast to the above-described embodiment, the oxidation-catalytically active coating does not extend over the entire length of the substrate in this case.

If the entire length of the substrate is L, the length of the oxidation-catalytically active zone is $L_1$ and the length of the zone containing a mixture of aluminum oxide and cerium oxide is $L_2$, then $L=L_1+L_2$, In production, it can happen that $L_1+L_2$ does not precisely correspond to L. For example, $L_1+L_2$ can be somewhat greater than L. This means that the two zones $L_1$ and $L_2$ overlap to a slight degree. On the other hand, $L_1+L_2$ can be slightly smaller than L, which means that a small gap that is uncoated is located between $L_1$ and $L_2$.

In a preferred embodiment of the present invention, the material zone ($L_2$) containing a mixture of aluminum oxide and cerium oxide takes up 25 to 67% of the entire length of the substrate. Accordingly, the oxidation-catalytically active zone ($L_1$) takes up 33 to 75% of the entire length of the substrate.

The material zone containing a mixture of aluminum oxide and cerium oxide is always arranged downstream; in the exhaust gas treatment system, it therefore points in the direction of the SCR catalyst.

In a preferred embodiment of the method according to the invention, the exhaust gas treatment system comprises, in the direction of flow of the exhaust gas, a flow-through substrate (oxidation catalyst) containing platinum group metal, a diesel particulate filter and an SCR catalyst. To the extent that the diesel particulate filter is also provided with an oxidation-catalytically active coating, the mixture of aluminum oxide and cerium oxide preferably is located on the diesel particulate filter. Otherwise, it can also be located on the flow-through substrate (oxidation catalyst) containing platinum group metal.

In embodiments of the present invention, SCR catalysts are conventional products that are frequently described and known to the person skilled in the art, They are routinely flow-through honeycomb bodies onto which the catalytically active components are applied in the form of a coating.

SCR catalysts that are based on vanadium oxide, or based on vanadium-free mixed oxides, as well as those based on zeolite are suitable. Zeolite-based SCR catalysts are preferred, in particular those that are exchanged with iron and/or copper. Particularly preferred SCR catalysts of this type are copper- and/or iron-containing zeolites of the chabazite and levyne type.

In another embodiment of the method according to the invention, the exhaust gas treatment system comprises, in the direction of flow of the exhaust gas, a flow-through substrate (oxidation catalyst) containing platinum group metal and comprising a mixture of aluminum oxide and cerium oxide, as well as a diesel particulate filter onto which an SCR catalyst is applied in the form of a coating. In certain circumstances, this system can also comprise another SCR catalyst downstream of the diesel particulate filter.

Finally, embodiments of the method according to the invention are also conceivable in which the exhaust gas treatment system comprises, in the direction of flow of the exhaust gas, a platinum group metal-containing flow-through substrate (oxidation catalyst) and an SCR catalyst downstream thereof, i.e., it does not comprise a diesel particulate filter.

The catalytically active coating is applied onto flow-through honeycomb bodies and filter bodies according to routine dip coating methods, or pump and suction coating methods with subsequent thermal aftertreatment (calcination and possibly reduction with forming gas or hydrogen), which are sufficiently known with regard to these exhaust gas purification aggregates from the prior art.

The diesel particulate filter according to the invention is highly suitable for lastingly protecting SCR catalysts from contamination with platinum and hence from a loss of activity. It has been shown in particular that the method according to the invention can effectively prevent the contamination of the SCR catalyst with platinum group metal in an economically advantageous manner. This is impressively revealed in the following examples.

EXAMPLES

A conventional oxidation catalyst that is a loading of 0.7 g/L (20 g/ft$^3$) aluminum oxide on a conventional flow-through substrate was combined with different aluminum oxide/cerium oxide mixtures as platinum catchers as indicated in table 1. To this end, a catalyst was respectively coated with the corresponding amount of platinum catcher and placed downstream of the oxidation catalyst. The lengths of the oxidation catalyst and platinum catcher were selected so that 67% of the entire length was taken up by the oxidation catalyst, and 33% of the entire length was allotted to the platinum catcher.

In the fresh state, they were subjected to a model gas of the following composition in a conventional model gas system with an isothermal reactor at a constant temperature of 650° C. over 18 hours in order to determine the platinum migration of the oxidation catalysts:

| | |
|---|---|
| CO | 71 ppm |
| NO | 820 ppm |
| $O_2$ | 6.3 volume percent |
| $CO_2$ | 8.9 volume percent |
| $H_2O$ | 11 volume percent in the measurements lasting 18 hours, and 5 volume percent in the measurements lasting 60 hours |
| $N_2$ | Balance |

The gas leaving downstream of the respective oxidation catalyst was guided through a flow-through substrate having a length of 5 cm (2") and coated with an SCR catalyst of the iron-ß-zeolite type. The amount of platinum bound in the SCR catalyst was then determined for each catalyst. To this end, a drilling core of the catalyst was melted in a crucible by means of an NiS fire assay, and the platinum was then determined by means of ICP-OES.

As a comparison, pure aluminum oxide and pure cerium oxide were measured. The following results were obtained:

| Example | Composition [percent by weight] | Amount of platinum [ppm] |
|---|---|---|
| Example 1 | 90 aluminum oxide 1 + 10 cerium oxide 1 | <0.2 |
| Example 2 | 70 aluminum oxide 1 + 30 cerium oxide 1 | <0.2 |
| Example 3 | 70 aluminum oxide 1 + 30 cerium oxide 1 | <0.2 |
| Comparative example 1 | Cerium oxide 1 | 0.2 |
| Comparative example 2 | Cerium oxide 2 | 0.3 |
| Comparative example 3 | Aluminum oxide 2 | 1.8 |
| Comparative example 4 | Aluminum oxide 3 | 2.4 |

Aluminum oxide 1 is a commercially available pure aluminum oxide

Aluminum oxide 2 is a commercially available mesoporous aluminum oxide doped with 4% by weight lanthanum from manufacturer 1

Aluminum oxide 3 is a commercially available mesoporous aluminum oxide doped with 4% by weight lanthanum from manufacturer 2

Cerium oxide 1 is a commercially available pure cerium oxide from manufacturer 3

Cerium oxide 2 is a commercially available pure cerium oxide from manufacturer 4

The results show that cerium oxide, at least up to 90% by weight, can be replaced by the cheaper aluminum oxide without worsening the effect.

The invention claimed is:

1. A method for avoiding platinum group metal contamination of an SCR catalyst that is positioned for exhaust gas contact in an exhaust gas treatment system;

comprising passing the exhaust gas into contact with a catalyst containing platinum group metal upstream of the SCR catalyst, the method further comprising passing the exhaust gas into contact with a material zone that contains a mixture of aluminum oxide and cerium oxide, which material zone is located upstream of the SCR catalyst receiving the exhaust gas.

2. The method according to claim 1, wherein the catalyst containing platinum group metal is a platinum group metal-containing oxidation catalyst or a particulate filter provided with an oxidation-catalytically active coating that contains platinum group metal.

3. The method according to claim 1, wherein the platinum group metal is platinum.

4. The method according to claim 1, wherein the mixture of aluminum oxide and cerium oxide comprises aluminum oxide in amounts of 10 to 90% by weight relative to the weight of the mixture of aluminum oxide and cerium oxide.

5. The method according to claim 1, wherein the mixture of aluminum oxide and cerium oxide is a physical mixture.

6. The method according to claim 1, wherein the material zone that contains a mixture of aluminum oxide and cerium oxide is borne on a catalyst substrate that is located between the platinum group metal-containing catalyst and the SCR catalyst.

7. The method according to claim 1, wherein the material zone that contains a mixture of aluminum oxide and cerium oxide is located as an additional material zone on the catalyst containing platinum group metal.

8. The method according to claim 7, wherein the catalyst containing platinum group metal comprises an oxidation-catalytically active coating distributed homogeneously over the entire length of the substrate, and the material zone that contains a mixture of aluminum oxide and cerium oxide is present as an additional layer on the oxidation-catalytically active coating and covers at least a part of its entire length the oxidation-catalytically active coating, starting from the end of the platinum group metal-containing catalyst arranged downstream.

9. The method according to claim 1, wherein the catalyst containing platinum group metal comprises an oxidation-catalytically active coating, and the oxidation-catalytically active coating and the material zone that contains a mixture of aluminum oxide and cerium oxide are present in separate zones on the platinum group metal-containing catalyst.

10. The method according to claim 9, wherein the material zone that contains a mixture of aluminum oxide and cerium oxide takes up 25 to 67% of the entire length of the catalyst containing platinum group metal.

11. The method according to claim 1, wherein the catalyst containing platinum group metal has a platinum-rich coating of the platinum group metal.

12. The method of according to claim 11, wherein the platinum-rich coating contains exclusively platinum as the platinum group metal.

13. The method of according to claim 11, wherein the platinum-rich coating contains exclusively platinum and palladium as the platinum group metal with a weight ratio of platinum to palladium being 12:1 to 4:1.

14. The method according to claim 1, wherein the mixture of aluminum oxide and cerium oxide comprises aluminum oxide in amounts of 30 to 70% by weight relative to the weight of the mixture of aluminum oxide and cerium oxide.

15. The method according to claim 1, wherein the mixture of aluminum oxide and cerium oxide comprises aluminum oxide in amounts of 40 to 60% by weight relative to the weight of the mixture of aluminum oxide and cerium oxide.

16. The method according to claim 1, wherein the mixture of aluminum oxide and cerium oxide comprises aluminum oxide in amounts of 30 to 90% by weight relative to the weight of the mixture of aluminum oxide and cerium oxide.

17. The method according to claim 1, wherein the mixture of aluminum oxide and cerium oxide comprises aluminum oxide in amounts of 40 to 90% by weight relative to the weight of the mixture of aluminum oxide and cerium oxide.

* * * * *